United States Patent [19]

Cox et al.

[11] 3,894,238

[45] July 8, 1975

[54] LAMINATED DOSIMETRIC CARD

[75] Inventors: Francis Morgan Cox, Bedford Heights; James D. Chamberlain, Aurora; Erwin F. Shrader, East Cleveland; Bruce M. Shoffner, Shaker Heights; Andras Szalanczy, Oakwood Village, all of Ohio

[73] Assignee: Kewanee Oil Company, Bryn Mawr, Pa.

[22] Filed: Dec. 5, 1973

[21] Appl. No.: 422,014

Related U.S. Application Data

[63] Continuation-in-part of Ser. No. 203,281, Nov. 30, 1971.

[52] U.S. Cl. ............... 250/484; 250/475; 250/482; 250/486; 250/487
[51] Int. Cl. ............................................ G01t 1/11
[58] Field of Search .......... 250/475, 476, 480, 482, 250/483, 484, 487, 486; 340/146.3 F, 146.3 G, 173 TP

[56] References Cited
UNITED STATES PATENTS

| | | | |
|---|---|---|---|
| 2,855,519 | 10/1958 | Kocher | 250/476 |
| 3,202,821 | 8/1965 | Kocher | 250/482 |
| 3,393,318 | 7/1968 | Brady et al. | 250/482 |
| 3,562,480 | 2/1971 | Korba | 250/486 |
| 3,612,870 | 10/1971 | Brennan | 250/482 |
| 3,652,854 | 3/1972 | Wheeler | 250/484 |
| 3,786,254 | 1/1974 | Yamashita et al. | 250/483 |

Primary Examiner—Harold A. Dixon
Attorney, Agent, or Firm—Cain and Lobo

[57] ABSTRACT

A laminated card with one or more apertures, each adapted to peripherally seal an encapsulated dosimeter, is formed by bonding a foraminous, code-adaptable, rigid sheet of low-Z material with a codedly transparent sheet of low-Z material in light-transmitting registry with particular code-holes of the rigid sheet. The laminated card may be coded to identify the person carrying it, and/or the location or circumstances related to its exposure to radiation. This card is particularly adapted for use in an instrument capable of evaluating a multiplicity of cards, substantially continuously. The coded identification from the card may be displayed by an appropriate machine, and if desired an evaluation may be recorded because of a "parity checking" system incorporated in each card, which permits "auto-correction." Alternatively, where means for effecting the correction automatically are available, the operation of the machine may be interrupted to permit visual examination of a rejected card. The card of this invention is also coded for identifying the type of card with respect to its specific function, and whether or not a card is correctly positioned at any predetermined location during its sequential progress through the instrument in which it is evaluated. Dosimeters are evaluated and the card identified in one pass through the instrument.

8 Claims, 4 Drawing Figures

PATENTED JUL 8 1975　　　　　　　　　　　　　　　　3,894,238

LAMINATED DOSIMETRIC CARD

CROSS-REFERENCE TO RELATED APPLICATIONS

This application is a continuation-in-part of Ser. No. 203,281, filed Nov. 30, 1971.

BACKGROUND OF THE INVENTION

Radiation is routinely measured by exposing a thermoluminescent dosimeter to radiation and thereafter measuring the light output of the dosimeter when it is heated. Various thermoluminescent materials are known, the preferred ones being crystalline ionic salts of the alkali metal and alkaline earth metals. Radiation dosimetry utilizing crystal dosimeters, either in powder form, or as an individual crystalline section of either a single crystal or a polycrystalline material (sometimes referred to as a "chip"), is the most widely utilized method for monitoring the radiation to which persons, in an ambience of potentially injurious radiation, have been exposed over a preselected time interval, ranging from a few minutes to several weeks.

Conventionally, persons likely to be exposed to radiation carry a dosimeter fixedly mounted in a support such as a card which is subsequently read by being positioned for heat conductive contact with a heated element in a light-tight chamber. The heated dosimeter luminesces and, with the aid of a photo-multiplier tube, generates a reading indicative of the level of radiation to which the dosimeter and the person carrying it has been subjected. It will be apparent, where a large number of persons are susceptible to radiation in their working environment, the level of radiation to which each has been subjected must be monitored relatively frequently, and the speed and accuracy with which this can be done assumes overriding importance.

An instrument presently used to evaluate a multiplicity of dosimeters essentially continuously, with desireable speed and accuracy, not heretofore obtainable, is disclosed in detail in copending patent application, Ser. No. 203,281, the subject matter of which is incorporated by reference herein. The laminated card of this invention, having one or more encapsulated dosimeters, is particularly adapted to the aforementioned instrument though it may also be used in others.

The capabilities of speed and accuracy of this automatic instrument would be vitiated without a means for repetitively reliably presenting each dosimeter in a card, at a predetermined precise location at which it is to be heated and evaluated. Keeping in mind that an acceptable card is, desirably, evaluated simultaneously for reading radiation dosage as well as for identifying the card as quickly as possible, it is imperative that the card be evaluated with a minimum of handling, in a single pass through the instrument. Moreover, since neither dosimeters or the cost of coding a card is inexpensive, it is desirable to provide a card which is reusable, over and over again, without the card being damaged sufficiently to interfere with the operation of the instrument.

Convenient forms of dosimeters in cards have been suggested to fill this need, such as, for example, a card as described in U.S. Pat. No. 3,652,854, and more recently in a card with twin dosimeters, one of which was read in a first pass through the reading machine and the second dosimeter read in a second pass, after the card was reversed. The inconvenience of this procedure negated the use of such a card for those applications where a relatively large number of cards are to be evaluated economically.

Thus, there has been a need for a coded card with twin dosimeters disposed therein, both of which may be read successively, by contacting each dosimeter with a heating element in a suitable instrument, in a single pass therethrough, and at the same time identifying the card without interfering with the accuracy of evaluation of the dosimeter.

It is with this background, and particularly because of the difficulty of reliably encapsulating two dosimeters in a suitable material of adequate theremal stability, at the same time precisely locating the dosimeters in a machine-evaluatable card, that the card of this invention was developed.

SUMMARY OF THE INVENTION

A laminated card comprising a foraminous, codeadaptable rigid sheet of essentially non-luminescent material, on which is superposed a codedly transparent sheet of non-luminescent material in light-transmitting registry with particular code-holes of the foraminous sheet, is adapted to peripherally seal one or more dosimeters encapsulated in a heat-sealable substantially light-permeable synthetic resinous material which is itself essentially non-luminescent.

It is a general object of this invention to provide a laminated card in which one or more dosimeters are encapsulated in spaced-apart relationship with each other to permit each dosimeter to be evaluated sequentially, in a single pass, through any device adapted to automatically evaluate thermoluminescent dosimeters.

It is another general object of this invention to provide a laminated reusable card having at least two dosimeters, individually, fixedly encapsulated in a heat-sealable polyolefin resin, so as to permit repetitive readings of each dosimeter (as the card is reusable) at a predetermined location.

It is a specific object of this invention to provide a coded laminated card in which one or more envelopes containing an encapsulated dosimeter is secured between a rigid substrate of low-Z material and a sheet of film, the substrate being provided with a recessed portion on one side thereof, so as to accommodate the envelope in a manner which permits the sheet of film to lie in essentially a plane parallel to the outer surface of said substrate.

It is still another object of this invention to provide a coded laminated dosimetric card having a rigid substrate with vertical edges which prevent damage to the edges of the film material, facilitate the ejection of an individual card from a magazine and the passage of the card through a feeding means of an automatic instrument for evaluating the dosimeters.

These and other objects of the laminated card of this invention will become apparent to those skilled in the art from the following description of a preferred form thereof, reference being had to the accompanying drawings.

BRIEF DESCRIPTION OF THE DRAWINGS

In the figures of the drawing, like reference numerals are used to denote like parts. Some of the parts have been dimensionally exaggerated, for clarity of illustration and to facilitate the description of the fabrication of the card.

PREFERRED EMBODIMENT OF THE INVENTION

Figure 1:
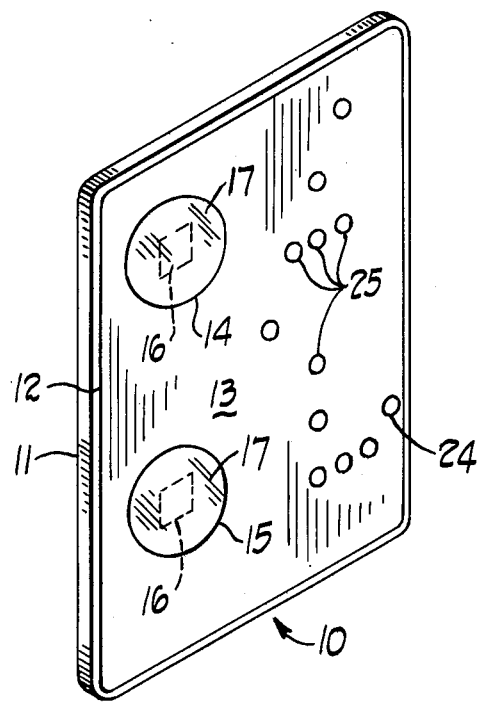
FIG. 1 is a perspective view on an enlarged scale of the laminated card as viewed from the front (the "film side") showing vertical edges at a foraminous code-adaptable rigid sheet or substrate to which is secured a codedly transparent sheet of film material.
Figure 2:
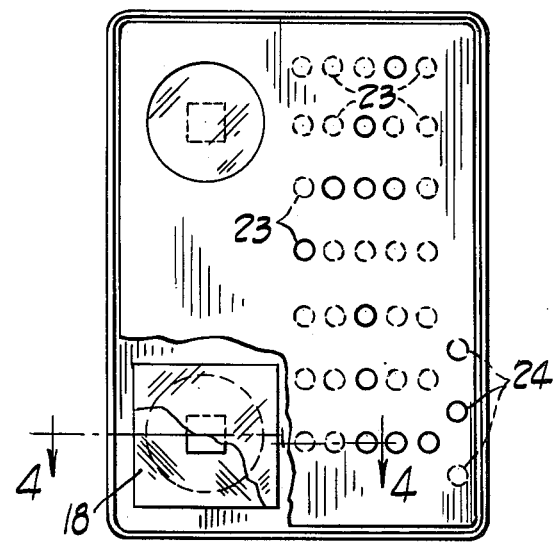
FIG. 2 is a front elevation or film side view of the card, on an enlarged scale, with portions broken away to show an encapsulated dosimeter secured between the substrate and the film material, showing light permeable spots in the film in solid outline, and, perforations in the substrate in dotted outline.

Referring now to FIGS. 1, 2, 3 and 4, the card indicated generally at 10, is made of a thin, code-adaptable substrate, such as a relatively rigid sheet 11 of essentially nonluminescent material, referred to as a low-Z material. A suitable material is aluminum having a thickness of about 0.005 to about 0.030 inch, which has peripheral vertical edges 12 between which is disposed a rectangular, codedly transparent sheet 13 also of low-Z material, which is adhesively bonded to the aluminum to form a laminate. The dimensions of the card are preferably about 1 3/16 inch × 1 11/16 inch. Near one side of the laminate card, as viewed when stood on its shorter side, are provided two apertures 14 and 15, the centers of which are aligned parallel to the longer axis of the rectangle. In each aperture is mounted a peripherally sealed thermoluminescent dosimeter 16 encapsulated in an envelope 17 of a suitable material transparent to light disseminated by the dosimeter, and which will not interfere with the readout of the dosimeter. Such a material may be a synthetic resinous material, preferably a heat-sealable polyolefin, e.g. fluorinated ethylene propylene polymers, and polytetrafluoroethylene (also referred to as PTFE), about 3 mil. thick. Optionally, an inert, non-luminescent filler may be used within the capsule formed by the PTFE, to position the dosimeter.

Each dosimeter 16 may be either a substantially rectangular crystal or chip (shown in the Figures) having dimensions approximately 0.32 cm. × 0.32 cm. and a thickness of about 0.08 cm, or, an accurately predetermined quantity of powder, a chip being preferred. The encapsulated chips 22 are fixedly encapsulated, preferably centrally within the apertures, the centers of which are approximately 2.5 cm. apart. The thickness of the substrate 11 is chosen so that each aperture 14 or 15 provides a recess for the surface of an envelope 17. This recess prevents the surface of the envelope from protruding beyond the planar surface of the substrate, as viewed from the metal side. Typically, apertures in a substrate having a thickness of about 0.025 in. provide an adequate recess. Each envelope 17 is formed by stretching sheets 18 and 19 of PTFE film over a dosimeter chip, and heat-sealing the edges.

It will be apparent to one skilled in the art that any encapsulation means may be used provided the material of the envelope 17 can withstand repeated heating, by contact, without substantially affecting either the physical properties of the material, or its light-transmitting characteristics. In this regard, it has been discovered that heat-sealable PTFE and fluorinated ethylene propylene polymers are unique among all materials that we are presently aware of. In particular, encapsulation of a dosimeter chip is most conveniently effected by placing the chip between the two thin sheets 18 and 19 of heat-sealable PTFE and bonding the edges by heat-sealing them, so as to maintain the dosimeter in snug relationship with each sheet.

In the lower portion of the aluminum sheet 11, below the apertures 14 and 15 for the dosimeters, is provided a plurality of code-adaptable perforations 23 in a rectangular grid pattern, and three additional card-check perforations 24, all of the perforations generally being standard for all cards. The perforations are provided in the aluminum sheet prior to lamination with the codedly transparent sheet 13, referred to, generally, as film material, which is to be positioned in a particular way, as will be explained, hereinafter.

Figure 4:
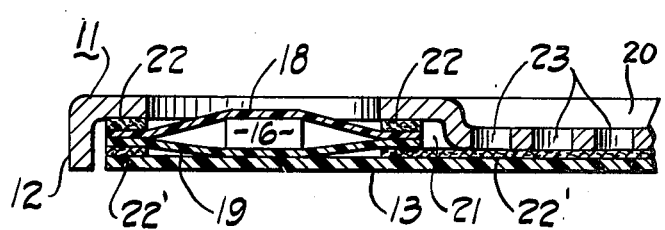
FIG. 4 is a cross-section view of the card approximately along the line 4—4 in FIGS. 2 and 3 showing the position of the encapsulated dosimeter; a portion of the card is broken away.

The vertical edges 12 of the aluminum sheet 11 enhance the rigidity of the laminate, and assist in positioning the sheet of film material 13. The height of the vertical edges is so chosen as to extend, downwardly, beyond the depressed portion 20, and to present, with the film 13, an essentially planar surface (as shown in FIG. 4) which does not unpredictably bias the card as it is fed through an instrument for reading, or otherwise evaluating it. The vertical surfaces of the edges 12 also provide a relatively wide surface which helps to guide the card through a feeding device for the cards. The vertical edges further enable the card to be selectively ejected from a magazine or cartridge, such as is used by an automatic instrument and prevent damage to the film edges.

Figure 3:
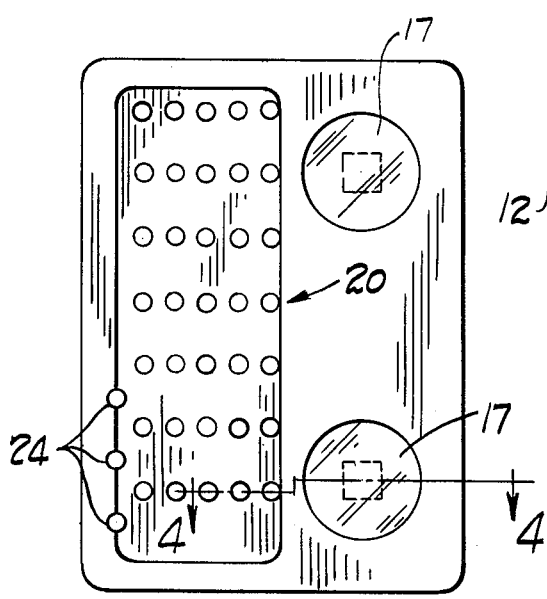
FIG. 3 is a rear elevation or "metal side" view of the card, on an enlarged scale, showing a rectangular recess having perforations in grid format, and, additionally, "card-check" perforations.

Referring now particularly to FIGS. 3 and 4 there is shown a rectangular depressed portion, indicated generally at 20, in which the perforations 23 are provided. The shape of the depressed portion is unimportant. The rectangular shape is convenient and compatible with the format of a 7 × 5 perforation grid used for identification of the individual cards. What is of especial importance is that the depressed portion 20 provides a rectangular trough or recess 21 along the opposite side of the metal substrate, and permits the encapsulated dosimeter to be advanced within the aperture 15, upwardly with respect to the downward displacement of the substrate which forms the depression 20. From the foregoing it will be seen that the substrate 11 is effectively doubly recessed on opposite surfaces due to (1) the depression 20 of a portion of the substrate and (2) the vertical edges 12. This structure of the substrate allows the laminated card to present a uniform planar surface on the metal side, and, with the film 13 overlaid on the envelopes 17, a smooth planar surface on the film side.

Each envelope 17 is secured to the aluminum, preferably by adhesively bonding it thereto. Typically on adhesive strip 22 about 0.003 inch thick, of mylar, or the like, having both surfaces coated with adhesive, is used, after the strip is punched to accommodate each aperture.

The rectangular, codedly transparent sheet 13 is preferably of a conventional photographic film which has been exposed so as to have light-permeable spots 25, in a preselected code, corresponding to particular perforations in the aluminum sheet. The light-permeable spots are conveniently provided by using a master board with a grid pattern of perforations, behind which board are bulbs corresponding to the grid pattern 23 of perforations in the aluminum sheet. Particular bulbs in the grid pattern are lighted for coding each card, and an exposure is made of each identification pattern, which pattern uniquely identifies a card. When the film is developed, it is cut into the appropriate size of rectangular sheet and superposed over the aluminum sheet 11 with the light-permeable spots 25 on the coded sheet of film in light-permeable registry with corresponding perforations in the aluminum sheet. The spots 25 are preferably infrared light-permeable to permit use of an infrared light source, and additionally are transparent to visible light, to enable a person to check the card visually. The preferred grid pattern for coding each card incorporates a double parity check system, such as is well-known to those skilled in the art, by which a single error in sensing the presence or absence of any light-permeable spot may be automatically recognized and corrected, and by which any double error may be recognized.

The coded and trimmed sheet of film 13, with appropriate holes punched to accomodate each encapsulated dosimeter, is overlaid in contact with the lower surface of the depressed portion 20, and the envelopes containing the encapsulated dosimeters. Typically another adhesive strip 22', of mylar or the like, having both surfaces coated with adhesive, may be used to secure the film 13 to the depressed portion of the metal substrate and to the envelopes 17. The depressed portion 20 is typically displaced about 0.015 inch to match the accumulated thicknesses of a first strip of adhesive tape (about 0.003 inch), the thickness of two heat-sealed sheets 18 and 19, another strip of adhesive tape, and, the film 13.

In addition to the bulbs corresponding to the grid pattern on the master board corresponding to perforations 23, there are also included three bulbs corresponding to the three card-check perforations 24. These perforations are linearly disposed along the edge of a card opposite the dosimeters, and are referred to as card-check perforations because they serve to identify the type of the card according to its function, e.g. whether a card is a calibration card for background and sensitivity, or a beta-ray card, a gamma-ray card, neutron card, etc. The "card-check" holes 24 are also referred to as "location-check" holes since they serve an ancillary function. For example, when a card is correctly presented in the vertical chute of the aforementioned automatic instrument, in the first position, light sensors recognize the card as being one which has mounted therein a single dosimeter, or twin dosimeters, or none. If the card has no dosimeter, the card may require the instrument to make a calibration check using a light source, or a check of background illumination, or both. Additionally, where the card-check holes identify a card by type, say as a "neutron card", the instrument may be required to evaluate both dosimeters, one of which is screened or filtered, and to normalize the readout. If no card arrives at the first portion, all light tube sensors are "on"; on the other hand, if a card arrives in an inverted position, all light pipes or sensors are "off" indicating an incorrectly presented card. However, if for example, only the center hole of the perforations 24 is in light-transmitting registry, it will indicate that the card is a twin-dosimeter card, and that it has arrived at the first position in correct orientation.

The light tubes or sensors register the presence of a card when each is "off", that is, when an opaque portion of the card interrupts the light beam. Appropriate card-check light-permeable spots corresponding to at least one of the perforations 24 are provided on the film by the exposure tecnique described hereinabove. Instead of photographic film, any suitable low-Z material which does not interfere with the readout of the dosimeter may be used. Light-permeable spots for coding the card may be provided with any preselected, codedly transparent format which may be obtained by other means, as for example, by puncturing the low-Z material for light transmission in registry with particular holes of the rigid aluminum sheet. Though reference has been made, hereinabove, to three card-check holes, it will be apparent that the number of holes provided is a matter of choice depending on the different types of cards to be evaluated by an instrument. Three card-check perforations permit identification of 6 types of cards, it being recognized that two combinations are unusable, namely, when all sensors are "off", indicating that the card is incorrectly positioned; and when all sensors are "on" indicating no card is present.

Instead of conventional photograhic film, for example, in an alternative embodiment, a base sheet of light-permeable material may be coated with a deposit of a thin layer of metal. Specific spots of the deposit metal may then be etched away to provide light-permeable spots on the coated sheet. In still another embodiment, a thin sheet of metal, less than 0.0010 inch thick, of copper may be etched to provide light-permeable spots.

The term dosimeter is used hereinabove to refer to a predetermined quantity of a thermoluminescable dosimeter for measuring radiation dosage. Particularly suitable materials for dosimeters are activated lithium fluoride, calcium fluoride, calcium sulfate, and the like. These materials may be used in powder form but are more typically used in the form of single crystals, rods, ribbons or chips. Indium, or alternatively, silver, gold or other neutron-activated materials, may be used for dosimeters to detect the presence of neutrons.

Reference is made to an envelope formed from a heat-sealable polyolefin such as PTFE. It will be recognized that heat-sealing of PTFE film also sinters the material. Sintering transforms a film which is substantially opaque to visible light, into a film which is essentially transparent to visible light. Effecting such a transformation is not easy because of the necessary precise control of high temperature conditions required for sintering PTFE. This difficulty is obviated by encapsulating a dosimeter in an envelope of presintered PTFE film, or tape, which is laminated to a heat-sealable fluorinated ethylene propylene (FEP) film, such as is available as "Fluorofilm" DF=1700 from Dielectrix Corp. Thus, variations in properties of unsintered PTFE are avoided and the transparency of film is known in advance. At the same time, the relative ease of heat-sealing FEP permits better control of the manufacture of the encapsulated dosimeters.

Modifications, changes, and improvements to the preferred forms of the laminated card herein disclosed, described and illustrated may occur to those skilled in the art who come to understand the principles of its fabrication and the functions of its component parts. Accordingly, the scope of the patent to be issued herein should not be limited to the particular embodiment of the card set forth herein, but rather should be limited by the advance by which the laminated card has promoted the art of presenting dosimeters to be automatically read.

We claim:

1. A laminated card adapted to be worn by a person susceptible to potentially injurious radiation, comprising a foraminous, code-adaptable rigid substrate of essentially non-luminescent material on which is adhered a non-luminescent sheet of film material light-permeably coded in light-transmitting registry with particular holes of said substrate to enable said card to be uniquely identified in accordance with a preselected code, said substrate having vertical edges confining said film material, and, a depressed portion, said depressed portion providing a rectangular trough or recess along the opposite side of said substrate, said substrate and said non-luminescent sheet having one or more apertures from about 0.2 cm. to about 2 cm. in diameter, each said aperture adapted to have commonly disposed therebetween in said trough or recess a dosimeter encapsulated in an envelope of a heat-sealable essentially non-luminescent synthetic polymeric resin, said envelope being secured between said substrate and said film material, whereby a dosimeter may be heated at a pre-determined location in an automatic evaluation instrument.

2. The laminated card of claim 1 wherein said substrate is relatively thin, having a thickness in the range from about 0.005 in. 0.030 in., and said vertical edges extend, peripherally, in the same direction as that in which said depressed portion is deformed.

3. The laminated card of claim 1 wherein said heat-sealable essentially non-luminescent synthetic polymeric resin is polytetrafluoroethylene.

4. The laminated card of claim 1 wherein said heat sealable essentially non-luminescent synthetic polymeric resin is a laminate comprising sintered polytetrafluoroethylene and heat-sealable fluorinated ethylene propylene resins.

5. The laminated card of claim 1 having at least two common apertures.

6. In a laminated card adapted to register potentially injurious radiation on one or more dosimeters fixedly disposed between a foraminous, code-adaptable substrate of essentially non-luminescent material and a codedly light-permeable, non-luminescent sheet of film material in light-transmitting registry with particular holes of said foraminous substrate to enable said card to be uniquely identified in accordance with a preselected code, the improvement comprising a depressed portion which provides a rectangular trough or recess along the opposite side of said substrate, and peripheral vertical edges extending downwardly beyond said depressed portion, said film material being disposed intermediate said vertical edges which confine said material to present an essentially planar surface.

7. An encapsulated dosimeter for persons or objects exposed to a source of said radiation, comprising a predetermined quantity of thermoluminescable material sealingly encapsulated within an envelope of a laminate comprising sintered polytetrafluoroethylene resin and a heat-sealable polymeric fluorinated ethylene propylene resin wherein contiguous surfaces of said fluorinated ehtylene propylene resin are heat-sealed.

8. The encapsulated dosimeter of claim 7 wherein said dosimeter is fixedly disposed within said envelope.

* * * * *